(12) United States Patent
Koch et al.

(10) Patent No.: US 11,504,634 B2
(45) Date of Patent: *Nov. 22, 2022

(54) SYSTEMS AND METHODS FOR DETERMINING HOW MUCH OF A CREATED CHARACTER IS INHERITED FROM OTHER CHARACTERS

(71) Applicant: Mythical, Inc., Sherman Oaks, CA (US)

(72) Inventors: Rudy Koch, Sammamish, WA (US); Jamie Jackson, Seattle, WA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,838

(22) Filed: Nov. 15, 2021

(65) Prior Publication Data

US 2022/0072435 A1   Mar. 10, 2022

Related U.S. Application Data

(63) Continuation of application No. 16/946,821, filed on Jul. 8, 2020, now Pat. No. 11,192,034.

(51) Int. Cl.
*A63F 13/825* (2014.01)
*A63F 13/58* (2014.01)
(Continued)

(52) U.S. Cl.
CPC ............ *A63F 13/825* (2014.09); *A63F 13/58* (2014.09); *A63F 13/792* (2014.09); *A63F 13/63* (2014.09);
(Continued)

(58) Field of Classification Search
CPC .......... A63F 2300/8058; A63F 2300/65; A63F 2300/575; A63F 13/825; A63F 13/58;
(Continued)

(56) References Cited

U.S. PATENT DOCUMENTS

| 5,572,646 A | 11/1996 | Kawai |
| 6,171,189 B1 | 1/2001 | Katano |

(Continued)

*Primary Examiner* — William H McCulloch, Jr.
(74) *Attorney, Agent, or Firm* — Esplin & Associates, PC

(57) ABSTRACT

Systems and methods for determining how much of a created character in a gaming platform is inherited from other characters are disclosed. Exemplary implementations may: electronically store information, wherein the information includes a set of character definitions, the individual character definitions defining attribute values of individual characters that can operate and interact within the gaming platform, wherein the individual characters include (i) designed characters with character definitions that include one or more attribute values that are based on at least some user input of designers and (ii) created characters with character definitions defined by at least some inheritance of attribute values from one or more other characters; and for individual ones of the individual characters that a given created character has inherited one or more attribute values from, determine a quantity of contribution that the one or more attribute values contribute to a character definition of the given created character.

20 Claims, 3 Drawing Sheets

(51) Int. Cl.
 *A63F 13/792* (2014.01)
 *A63F 13/63* (2014.01)
(52) U.S. Cl.
 CPC ... *A63F 2300/6018* (2013.01); *A63F 2300/65* (2013.01); *A63F 2300/8058* (2013.01)
(58) Field of Classification Search
 CPC ........ A63F 13/69; A63F 13/792; A63F 13/60; A63F 13/63; A63F 13/79; G06N 3/006
 See application file for complete search history.

(56) References Cited

U.S. PATENT DOCUMENTS

| | | | |
|---|---|---|---|
| 6,213,871 | B1 | 4/2001 | Yokoi |
| 6,251,010 | B1 | 6/2001 | Tajiri |
| 6,251,012 | B1 | 6/2001 | Horigami |
| 6,253,167 | B1 | 6/2001 | Matsuda |
| 6,254,477 | B1 | 7/2001 | Sasaki |
| 6,267,677 | B1 | 7/2001 | Tajiri |
| 6,449,518 | B1 | 9/2002 | Yokoo |
| 6,482,067 | B1 | 11/2002 | Pickens |
| 6,814,662 | B2 | 11/2004 | Sasaki |
| 6,832,955 | B2 | 12/2004 | Yokoi |
| 7,025,675 | B2 | 4/2006 | Fogel |
| 7,104,884 | B2 | 9/2006 | Yokoi |
| 7,117,190 | B2 | 10/2006 | Sabe |
| 7,179,171 | B2 | 2/2007 | Forlines |
| 7,599,802 | B2 | 10/2009 | Harwood |
| 7,690,997 | B2 | 4/2010 | Van Luchene |
| 7,789,758 | B2 | 9/2010 | Wright |
| 7,803,046 | B2 | 9/2010 | Scott |
| 7,806,758 | B2 | 10/2010 | Van Luchene |
| 7,867,093 | B2 | 1/2011 | Wright |
| 7,970,663 | B2 | 6/2011 | Ganz |
| 7,974,902 | B2 | 7/2011 | Van Luchene |
| 8,241,099 | B2 | 8/2012 | Blair |
| 8,262,471 | B2 | 9/2012 | Van Luchene |
| 8,272,956 | B2 | 9/2012 | Kelly |
| 8,313,364 | B2 | 11/2012 | Reynolds |
| 8,328,611 | B2 | 12/2012 | Sano |
| 8,328,643 | B1 | 12/2012 | Osvald |
| 8,540,570 | B2 | 9/2013 | Janis |
| 9,186,575 | B1 | 11/2015 | Janis |
| 9,186,582 | B2 | 11/2015 | Janis |
| 9,630,115 | B2 | 4/2017 | Bambino |
| 10,252,166 | B2 | 4/2019 | Bambino |
| 10,682,575 | B1 | 6/2020 | Jackson |
| 10,881,960 | B2 | 1/2021 | Bambino |
| 11,192,034 | B1 * | 12/2021 | Koch ................. A63F 13/58 |
| 2001/0036851 | A1 | 11/2001 | Sasaki |
| 2002/0082065 | A1 | 6/2002 | Fogel |
| 2002/0082077 | A1 | 6/2002 | Johnson |
| 2003/0119570 | A1 | 6/2003 | Maroun |
| 2003/0166414 | A1 | 9/2003 | Sako |
| 2003/0236119 | A1 | 12/2003 | Forlines |
| 2004/0009812 | A1 | 1/2004 | Scott |
| 2004/0053690 | A1 | 3/2004 | Fogel |
| 2004/0204127 | A1 | 10/2004 | Forlines |
| 2005/0243091 | A1 | 11/2005 | Hong |
| 2007/0111795 | A1 | 5/2007 | Choi |
| 2007/0176363 | A1 | 8/2007 | Bielman |
| 2008/0045285 | A1 | 2/2008 | Fujito |
| 2008/0274811 | A1 | 11/2008 | Ganz |
| 2009/0149233 | A1 | 6/2009 | Strause |
| 2011/0009190 | A1 | 1/2011 | Scott |
| 2011/0039622 | A1 | 2/2011 | Levenson |
| 2011/0039623 | A1 | 2/2011 | Levenson |
| 2011/0256937 | A1 | 10/2011 | Van Luchene |
| 2011/0263322 | A1 | 10/2011 | Van Luchene |
| 2012/0083322 | A1 | 4/2012 | Van Luchene |
| 2012/0238361 | A1 | 9/2012 | Janis |
| 2012/0238362 | A1 | 9/2012 | Janis |
| 2012/0264511 | A1 | 10/2012 | Marsland |
| 2012/0264520 | A1 | 10/2012 | Marsland |
| 2013/0079143 | A1 | 3/2013 | Mcguirk |
| 2013/0079145 | A1 | 3/2013 | Lam |
| 2013/0102379 | A1 | 4/2013 | Sargent |
| 2013/0109479 | A1 | 5/2013 | Ganz |
| 2014/0114630 | A1 | 4/2014 | Brave |
| 2021/0042819 | A1 | 2/2021 | Zhang |
| 2021/0101081 | A1 | 4/2021 | Jackson |

* cited by examiner

SYSTEMS AND METHODS FOR DETERMINING HOW MUCH OF A CREATED CHARACTER IS INHERITED FROM OTHER CHARACTERS

FIELD OF THE DISCLOSURE

The present disclosure relates to systems and methods for determining how much of a created character in a gaming platform is inherited from other characters in the gaming platform.

BACKGROUND

Gaming platforms are known. Using characters and/or avatars within games is known, e.g., to represent players playing the game. Letting players customize at least some part of their characters is known.

SUMMARY

One aspect of the present disclosure relates to a system configured for determining how much of a created character in a gaming platform is inherited from other characters. As used herein, the term "character" and derivations thereof may refer to any in-game assets and/or in-platform assets, including but not limited to digital characters and/or other entities, individuals, and/or personalities. The system may include one or more of an electronic storage, a hardware processor configured by machine-readable instructions, and/or other components. Machine-readable instructions may include one or more instruction components. The instruction components may include one or more of a contribution determination component, a benefit determination component, a benefit transfer component, a character creation component, and/or other instruction components.

The electronic storage may be configured to electronically store information. The information may include a set of character definitions. Individual character definitions may define attribute values of individual characters. The individual characters may operate and interact within the gaming platform. The individual characters may include designed characters, created characters, and/or other characters. The designed characters may be defined by character definitions that includes one or more attribute values based on at least some user input of designers. The created characters may have character definitions defined by at least some inheritance of attribute values from one or more other characters.

By way of non-limiting example, the designed characters may include a first designed character associated with a first character definition, a second designed character associated with a second character definition, and/or other designed characters. The first character definition may be based on user input from a first designer. The second character definition may be based on user input from a second designer, and so forth. The created characters may include a first created character associated with a third character definition. The third character definition may include inherited attribute values from the first designed character and the second designed character.

The contribution determination component may be configured to, for individual ones of the individual characters that a given created character has inherited one or more attribute values from, determine a quantity of contribution that the one or more attribute values contribute to a character definition of the given created character. By way of non-limiting example, the one or more attribute values from the first designed character may contribute a first quantity of contribution to the third character definition of the first created character. The one or more attribute values from the second designed character may contribute a second quantity of contribution to the third character definition. In some implementations, quantities of contribution may be expressed as a percentage. By way of non-limiting example, the first and second quantity of contribution to the third character definition may be 50% each.

As used herein, any association (or relation, or reflection, or indication, or correspondency) involving servers, processors, client computing platforms, users, players, definitions, representations, user interfaces, user input, selections, characters, hierarchies, quantities, contributions, values, benefits, presentations, probabilities, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1). As used herein, the term "user" (and derivatives thereof) and the term "player" (and derivatives thereof) may be used interchangeably.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
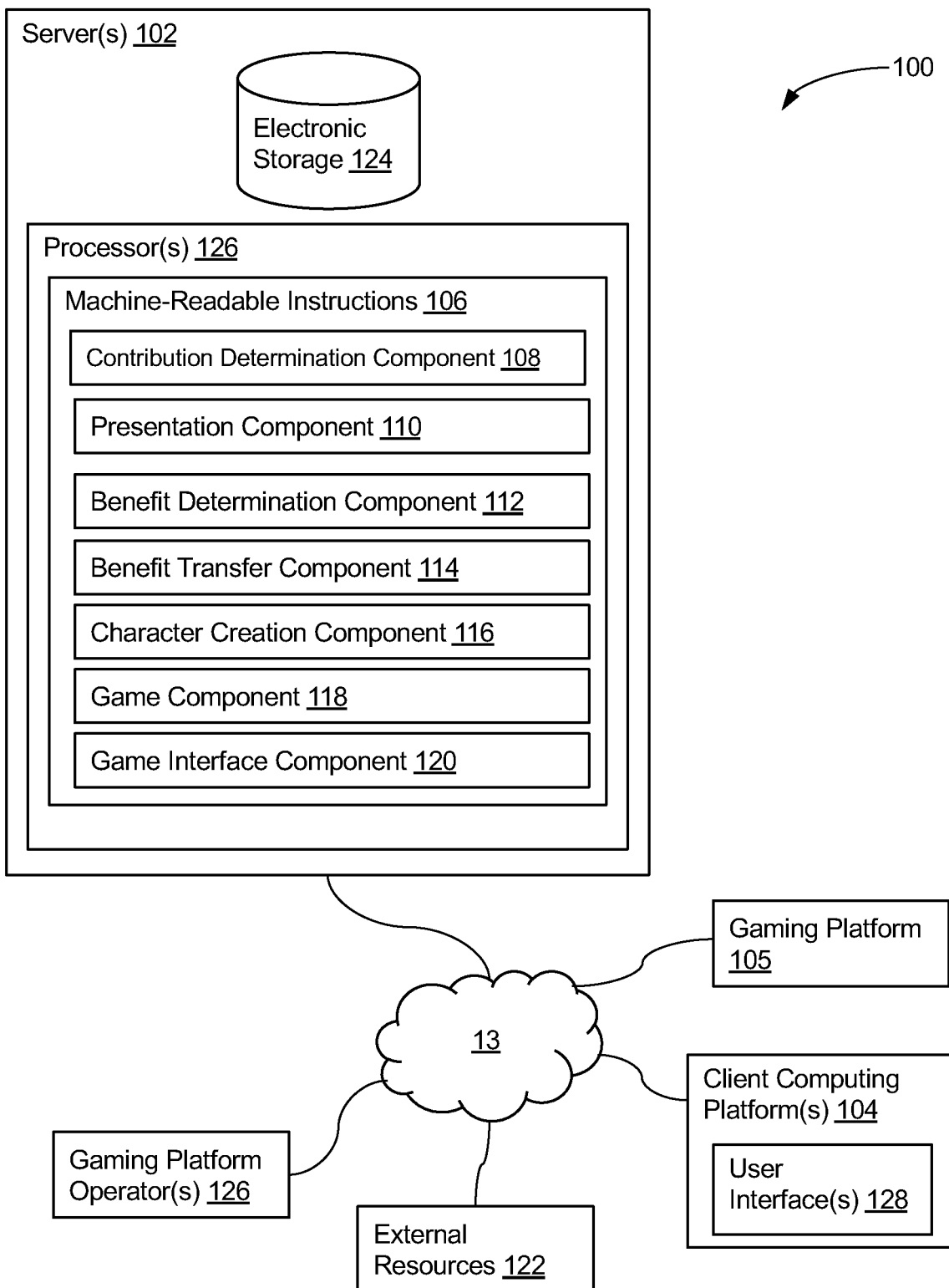
FIG. 1 illustrates a system configured for determining how much of a created character is inherited from other characters, in accordance with one or more implementations.

FIG. 1 illustrates a system 100 configured for determining how much of a created character in a gaming platform 105 is inherited from other characters, in accordance with one or more implementations. Newly created characters may form the basis for additional generation of characters through inheritance, thereby establishing lineage and/or ancestry. As used herein, gaming platform 105 may refer to an individual (video) game, a type of gaming console and its ecosystem, one or more related games and their ecosystem, and/or a combination thereof. In some implementations, gaming platform 105 may be configured to provide and/or host one or more (online) games within system 100. As used herein, the term "digital characters", "created characters", and "designed characters" may refer to entities within gaming platform 105 that are in part or as a whole controlled by players, e.g., through client computing platforms 104. As such, players can play games and/or otherwise interact with gaming platform 105 as certain digital characters. Characteristics of an individual character may include visual features of the individual character, as well as visible and/or invisible attributes that may have an effect on gameplay and/or other interactions within gaming platform 105.

In some implementations, system 100 may include one or more servers 102. Server(s) 102 may include electronic storage 124, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture, a client-server architecture, and/or other architectures. Users and/or players may access system 100 via client computing platform(s) 104.

In some implementations, system 100 and/or server(s) 102 may be configured to communicate with one or more of (online) gaming platform(s) 105, gaming platform operator(s) 126, and/or other components. Gaming platform operator 126 may refer to a host, operator, owner, and/or other stakeholder of gaming platform 105.

In some implementations, client computing platforms 104 may be associated with players. The players may include a first player, a second player, a third player, and so forth. For example, the first player may be associated with a first client computing platform 104, the second player may be associated with a second client computing platform, and so forth.

Server(s) 102 may be configured by machine-readable instructions 106. Machine-readable instructions 106 may include one or more instruction components. The instruction components may include computer program components. The instruction components may include one or more of a contribution determination component 108, a presentation component 110, a benefit determination component 112, a benefit transfer component 114, a character creation component 116, a game component 118, a game interface component 120, and/or other instruction components.

Electronic storage 124 may be configured to electronically store information. The information may include a set of character definitions. Individual character definitions may define attribute values of individual characters. Attributes that the attribute values define may include visual representation, movements, abilities, invisible attributes, and/or other attributes. The visual representations may include one or more colors, background colors, line detailing, body part proportions, skin, scars, tattoos, accessories, patterns, areas, regions, parts, and/or other components of bodies of characters, and/or their respective visual representations. The body part proportions of a head, torso, limbs (e.g., arms, legs), feet, hands, hairdo, and/or other body parts may be defined. The accessories may include headwear, jewelry, eyewear, footwear, gloves, scarves, and/or other accessories. The colors may be defined for one or more of the body parts, the accessories, the regions, skin of the characters, and/or other components of the bodies of the characters. The movements may include dance moves, fight moves, celebratory moves, casting spells, and/or other moves. The invisible attributes may include, without limitation, strength, constitution, dexterity, intelligence, wisdom, charisma, stamina, health level, experience, luck, and/or other attributes. The individual characters may operate and interact within gaming platform 105.

In some implementations, the stored information may be obtained from components external to system 100, including but not limited to external game servers. In some implementations, individual ones of the character definitions may include a hierarchical set of body component definitions of which may be inherited as a whole or in part as described in U.S. application Ser. No. 16/592,578 entitled "SYSTEMS AND METHODS FOR GENERATING IN-GAME ASSETS FOR A GAMING PLATFORM BASED ON INHERITING CHARACTERISTICS FROM OTHER IN-GAME ASSETS", the disclosure of which is incorporated by reference in its entirety herein.

The individual characters may include designed characters, created characters, and/or other characters. In some implementations, the designed characters may be defined by character definitions that includes one or more attribute values based on at least some user input of one or more designers. The designers may include one or more of a celebrity, an influencer, an artist, an actor, an athlete, and/or other designers to obtain a character design from. In some implementations, the designed characters may be entirely designed by the one or more designers (i.e., all of the attribute values are based on the user input of the one or more designers). In some implementations, the designed characters may be partly designed by one or more designers (i.e., some of the attribute values are based on the user input of the one or more designers). In some implementations, the created characters may have character definitions defined by at least some inheritance of attribute values from one or more other characters. The other characters from which the attribute values for the created character are inherited may include one or more of the designed characters and/or other created characters. As such, the character definitions of the created characters may include some attribute values that are based on the user input of the one or more designers. In some implementations, the character definitions of the individual created characters may include some of the attribute values inherited from one or more designed characters and attribute values defined by a player of the gaming platform 105. By way of non-limiting example, a given created character may have been modified by a given player.

In some implementations, character creation component 116 may be configured to create and/or generate created characters. In some implementations, character creation component 116 may operate by inheritance from one or more contributing characters (i.e., the designed character and/or the created characters). A character definition of a given created character may inherit to include at least some attribute values of one or more of the character definitions associated with other ones of the individual characters. The created characters may be created and/or generated upon obtainment and/or selection of one or more of the individual contributing characters. Individual characters may be made available to the players and/or obtained by the players by way of purchase, gift, free of charge, by way of discovery, as a prize (e.g., for winning a mini-game), by way of random distribution, and/or other obtainment methods. In some implementations, the individual characters may be available for obtainment by the players in limited quantities so that the individual characters may be rare and/or valuable. In some implementations, the individual characters may be selected by a player via a user interface to be blended and/or otherwise combined with one or more of the individual characters.

An individual user interface element may be configured to be selected by the users to effectuate blending of the individual characters to create created characters. The user interface elements may be configured to facilitate user interaction with the user interface, user entry, and/or selection. By way of non-limiting example, the user interface elements may include one or more of text input fields, drop down menus, check boxes, display windows, virtual buttons, and/or other user interface elements. Simultaneous to blending of the individual characters to create individual created characters, corresponding character definitions may be created or generated that define the attribute values of the individual created characters.

By way of non-limiting example, the designed characters may include a first designed character associated with a first character definition, a second designed character associated with a second character definition, and/or other designed characters. The first character definition may be based on user input from a first designer. The second character definition may be based on user input from a second designer. The created characters may include a first created character associated with a third character definition, a second created character associated with a fourth character definition, and/or other created characters. In some implementations, the first created character may be created by inheritance (by character creation component 116) from the first designed character and the second designed character. In some implementations, the third character definition of the first created character may include at least some inherited attribute values from the first designed character and the second designed character, i.e., the first character definition and the second character definition, respectively. The designed characters may further include a third designed character. The second created character may be created by inheritance (by character creation component 116) from the first created character and the third designed character. The fourth character definition of the second created character may include at least some inherited attribute values of the first created character and inherited attribute values of the third designed character, i.e., the first character definition and a fifth character definition, respectively. The fifth character definition may define the third designed character and may be based on user input from the third designer.

Contribution determination component 108 may be configured to determine a quantity of contribution that one or more attribute values contribute to a character definition of a given created character. In some implementations, contribution determination component 108 may be configured to make determinations for individual ones of the individual characters that the given created character has inherited one or more attribute values from. The quantity of contribution may be a percentage or otherwise a quantification of the one or more attributes inherited from the individual ones of the characters. In other words, the quantity of contribution may represent how much of the character definition of the given character is inherited from a particular character (e.g., a designed character).

By way of non-limiting example, the one or more attribute values from the first designed character may contribute a first quantity of contribution, say 60%, to the third character definition of the first created character. The one or more attribute values from the second designed character may contribute a second quantity of contribution, say 40%, to the third character definition.

In some implementations, determinations by contribution determination component 108 may occur subsequent to one or more purchases of a given created character. By way of non-limiting example, determining the first quantity of contribution and the second quantity of contribution to a first created character may occur subsequent to a first purchase of the first created character, e.g., by a first user.

In some implementations, determinations by contribution determination component 108 may be based on one or more prior inheritances of the (contributing) created characters. In some implementations, determinations by contribution determination component 108 may be based on a lineage of prior inheritances of a family tree of contributing characters. Such determinations may include determining a complement quantity of contribution. The complement quantity of contribution may be a value that is a complement to another quantity of contribution to the given character definition. The complement quantity of contribution may be determined based on the other quantity of contribution to the given character definition.

By way of non-limiting example, the one or more attribute values from the third designed character may contribute a third quantity of contribution, 50%, to the fourth character definition of the second created character. The remaining quantity of contribution may be contributed via inheritance the first created character (i.e., the first designed character and the second designed character). As such, a first complement quantity of contribution may be 50% contributed from the first created character. The one or more attribute values from the first designed character may contribute a fourth quantity of contribution to the fourth character definition via inheritance from the first created character. The one or more attribute values from the second designed character may contribute a fifth quantity of contribution to the fourth character definition via inheritance from the first created character.

The fourth quantity of contribution may be determined based on the first quantity of contribution and the third quantity of contribution. The fifth quantity of contribution may be determined based on the second quantity of contribution and the third quantity of contribution. Based on the third quantity of contribution, the first complement quantity of contribution of 50% may be determined of which has been inherited from the first created character. As such, based on the 60% inherited by the first created character from the first designed character and the 50% inherited by the second created character from the first created character, the fourth quantity of contribution of 30% may be determined. As such, based on the 40% inherited by the first created character from the second designed character and the 50% inherited by the second created character from the first created character, the fifth quantity of contribution of 20% may be determined. Thus, summation of the 50% inherited from the third designed character, the 30% inherited from the first designed character, and the 20% inherited from the second designed character, the second created character is completed (e.g., equals 100%).

In some implementations, contribution determination component 108 determining the quantity contribution to the character definition of the given created character may be based on an amount (e.g., a percentage) of the one or more attribute values inherited from the individual ones of the characters. The given created character may inherit more of the attribute values from a particular character than from one or more of other ones of the individual characters. The given created character may inherit more of the attribute values from a particular character than from user input of the player. For example, all attribute values for the first created character may be inherited from the first designed character except the headwear that is inherited from the second designed character and a tattoo that was input by the player. As such, a larger amount of the one or more attribute values are inherited from the first designed character than the second designed character and input by the player. Therefore, the quantity of contribution by the first designed character (and thus, the first designer) is larger than the quantity of contribution by the second designed character (and thus, the second designer) and is further larger than the quantity of contribution by the player.

In some implementations, determinations by contribution determination component 108 may be based on percentage of surface area of the one or more attribute values inherited from the individual characters. An individual attribute values inherited from a particular character that represents an attribute may cover a surface area. An individual attribute values input by the player may represent an attribute that covers another surface area. For example, aggregated surface areas of the one or more attributes (e.g., hairdo and clothing) inherited by the second created character from the third designed character may cover more than an aggregated surface area of one or more attributes (e.g., jewelry) inherited from the second designed character. Further, the aggregated surface areas of the one or more attributes (e.g., hairdo and clothing) inherited from the third designed character may cover more than an aggregated surface area of one or more attributes (e.g., tattoos) input by the player. In some implementations, the surface area of an attribute of an individual character may include the surface area the attribute covers on the individual characters in its entirety. In some implementations, attribute values for attributes such as patterns, colors, or otherwise a background design and/or image may not correspond with a particular surface area. For example, the surface area for a tattoo attribute may include the one or more lines that define the tattoo and the spaces between the lines. Conversely, a leopard-print design as a skin of a character may not correspond with a surface area percentage because it is a pattern.

In some implementations, determinations by contribution determination component 108 may be based on percentage of visible surface area of the one or more attribute values inherited from the individual characters. That is, the surface area of an individual attribute that is visible is significant versus the surface area of an individual attribute that is not visible or otherwise covered by another attribute. For example, aggregated surface areas of the one or more attributes (e.g., a beanie hat, a jacket, and a pair shorts) inherited by the second created character from the third designed character may be more visible that an aggregated surface area of one or more attributes (e.g., a hairdo and T-shirt) inherited from the second designed character. Thus, a quantity of contribute from the third designed character is greater than a quantity of contribution from the second designed character because the beanie hat covers surface area visibility of the hairdo, the jacket covers surface area visibility of the T-shirt aggregated with visible surface area of the pair of shorts. In some implementations, placement of the tattoo attribute on the individual character may increase a percentage of visible surface area, such placement on a face versus forearm.

In some implementations, determinations by contribution determination component 108 may be based on a storage size value of the individual designed characters. The storage size value may be an individual byte size value that is indicative of complexity of the individual designed characters. For example, the storage size of the first designed character may be greater than the storage size of the second designed character. Thus, the quantity of contribution the first designed character contributed to the first created character may be larger than the quantity of contribution the second designed character contributed to the first created character.

In some implementations, determinations by contribution determination component 108 may be based on time spent by the individual designers creating the individual designed characters. The time spent may include active time spent creating the individual designed character. Active time spent may include selecting and/or interacting with user interface elements to, for example, pick one or more colors, patterns, line thickness, orientations, sizes, among others. Active time spent may include virtually drawing one or more of a pattern and/or attribute via various input devices. The input devices may include a Smartpen, a stylus, a tablet computing platform to use the stylus with, a keyboard, a mouse, a touchpad, and/or other input devices. The active time spent virtually drawing and/or interacting with user interface elements, that is an aggregated time the input device spent moving and/or clicking, may be recorded (e.g., by external resources 122).

In some implementations, contribution determination component 108 determining the quantity of contribution to the character definition of the given created character may include equalizing the quantity of contribution based on an amount of the characters the character definition of the given created character inherited the one or more attribute values from. For example, the fourth character definition for the second created character includes attribute values inherited from the first designed character, the second designed character, and the third designed character. The quantity of contribution by each of these designed characters may be equally ⅓ as opposed to determining distinctive quantities of contribution for each of these designed characters that the second created character inherited from.

In some implementations, benefit determination component 112 may be configured to determine designer benefits for individual ones of the designers and/or determine other information. The designer benefits for individual ones of the designers may be based on individual quantities of contribution and a given (purchase) price of the given created character. The designer benefits may include one or more of a currency, points, credits, and/or other designer benefits that may be payable to the individual designers. The designer benefits may have a monetary value, be redeemed for monetary value, be redeemed for in-game assets within gaming platform 105, and/or have other types of value. For the given purchase price that the given created character was purchased for, the designer benefits may be a portion (i.e., the quantity of contribution) of the given purchase price. The portion of the given purchase price that is the designer benefits may be defined by gaming platform operators 126 and/or the designers themselves. For example, the designer benefits may be 10% of the given purchase price. Therefore, the set of designers whose attribute values of their designed characters have been inherited by the given created character may split the 10%.

In some implementations, benefit transfer component 114 may be configured to transfer designer benefits to the individual ones of the designers. In some implementations, benefit transfer component 114 may be configured to transfer the designer benefits to the individual ones of the designers responsive to purchases of created characters. In some implementations, the designer benefits may be transferred to wallets (e.g., within the gaming platform 105, external to the gaming platform 105) of the individual ones of the designers responsive to the one or more purchases of the given created character.

By way of non-limiting example, first designer benefits for the first designer may be based on the first quantity of contribution and a purchase price of the first created character. Second designer benefits for the second designer may be based on the second quantity of contribution and the purchase price of the first created character. For example, the purchase price of the first created character may be $100 and 5% of the purchase price may be for the designer benefits for respective designers as defined by gaming platform operators 126. Here, the designer benefits may be $2.50 for each of the first and second designers (assuming their split is 50-50).

The first designer benefits may be transferred to the first designer and the second designer benefits may be transferred to the second designer upon the first purchase of the first created character by the first user. For example, upon determination that the first created character inherited 60% of its attribute values from the first designed character and 40% of its attribute values from the second designed character, $3 may be transferred to the first designer and $2 may be transferred to the second designer.

Presentation component 110 may be configured to present user interfaces 128 to client computing platforms 104 associated with the players. For example, presentation component 110 may be configured to present user interface 128 to a first player on first client computing platform 104 associated with the first player. User interface 128 may display one or more individual characters in accordance with the attribute values defined by the set of respective character definitions. For example, the set of character definitions may include the first character definition defining the attribute values of the first designed character, a second character definition defining the attribute values of the second designed character, and so forth.

Figure 3:
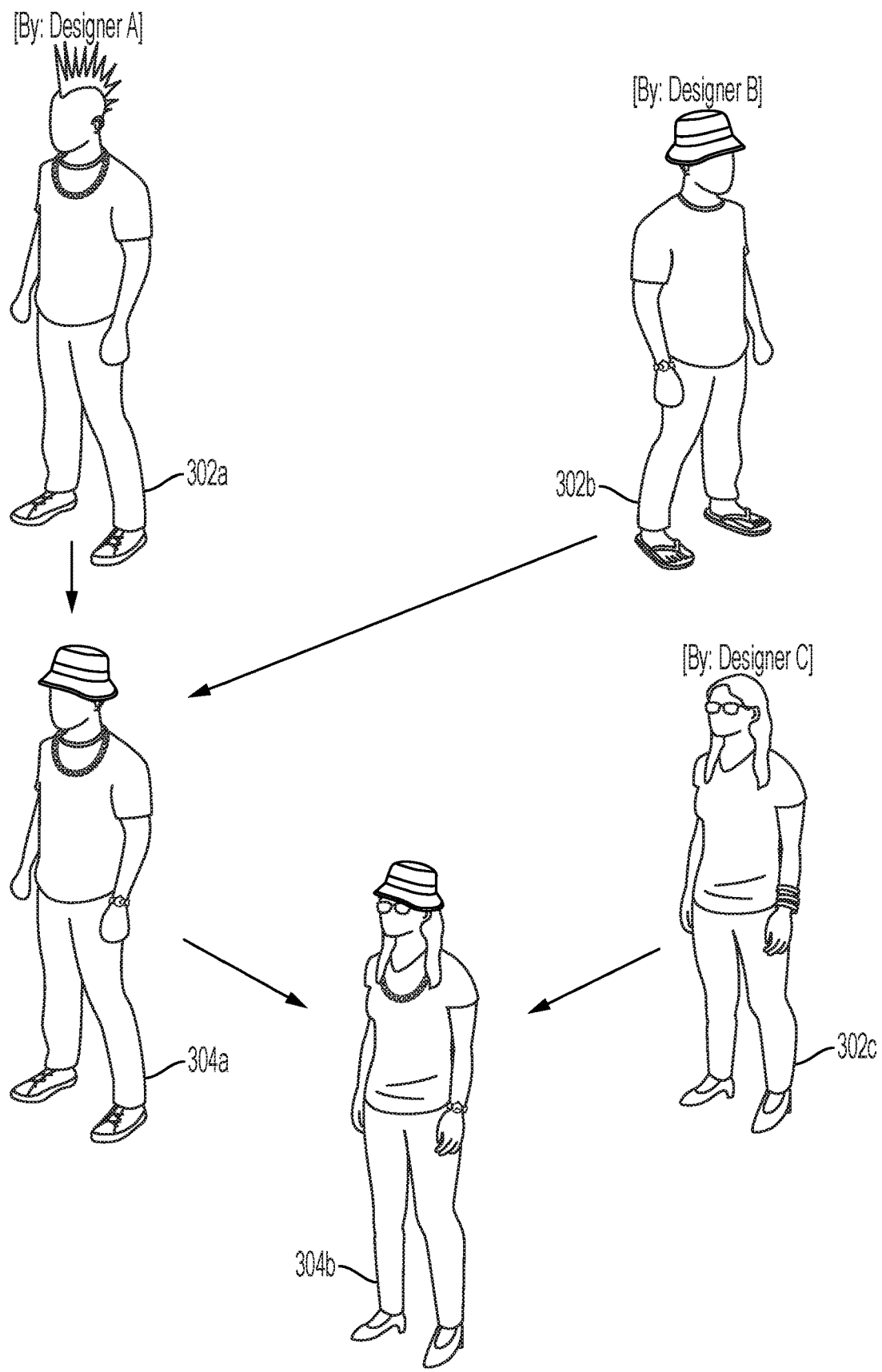
FIG. 3 illustrate representations of (combinations of) character definitions for individual characters as may be used by a system configured for determining how much of a created character is inherited from other characters, in accordance with one or more implementations.

FIG. 3 illustrate representations of characters as may be used by system 100. For example, presentation component 110 may present user interface 128 to a first player on a first client computing platform 104 such that user interface 128 displays a designed character 302a. As depicted, designed character 302a may have been designed by a "Designer A". Designed character 302a may be made available to the particular player by way of purchase, free of charge, discovery, and/or other obtainment methods. Designed character 302a may include, for example, a mohawk hairdo, a chain necklace, sneakers, and may be tall (i.e., attribute values). Simultaneously or subsequently, presentation component 110 may present user interface 128 to the first player on first client computing platform 104 such that user interface 128 displays a designed character 302b. Designed character 302b may have been designed by a "Designer B". Designed character 302b may be obtained by the particular player in a similar manner as designed character 302a. Designed character 302b may include, for example, a bucket hat, a watch, and sandals. Upon user obtainment and/or selection by the first player of designed character 302a and 302b, created character 304a may be created/generated (and its corresponding character definition). Based on inheritance from designed character 302a and 302b, created character 304a may include, for example, the bucket hat, the chain necklace, the watch, the sneakers, and may be tall. Furthermore, user interface 128 may display a designed character 302c. Designed character 302c may have been designed by a "Designer C". Designed character 302c may include, for example, long hair, glasses, bracelets, heels, and may be short. Upon the first player obtaining and/or selecting designed character 302c to be blended with created character 304a, a created character 304b may be created/generated. Based on inheritance from created character 304a (i.e., designed character 302a and 302b), inheritance from designed character 302c, and user input of the first player, created character 304b may include the bucket hat, the long hair, the glasses, the chain necklace, the watch, the heels, and may be tall.

By way of non-limiting illustration, created character 304a may be purchased by a second player on a second client computing platform 104 for 200 "stars" (i.e., the purchase price may use an in-game currency). Gaming platform operator(s) 126 may define that 10% of the purchase price, or 20 stars, may be transferred to the respective (contributing) designers based on the determined quantities of contribution by the designers who have contributed to created character 304a by way of attribute value inheritance.

In some implementations, based on the attribute values of created character 304a, contribution determination component 108 may determine quantities of contribution to the character definition of created character 304a such that that 60% of the attribute values of created character 304a are determined as contributions (of attribute values) from designed character 302a and 40% of the attribute values of created character 304a are determined as contributions (of attribute values) from designed character 302b. As such, the designer benefits for designer A may be 60% of the 20 stars, or 12 stars, and may be transferred to designer A. Further, the designer benefits for designer B may be 40% of the 20 stars, or 8 stars, and may be transferred to designer B.

Conversely, in some implementations, contribution determination component 108 may determine quantities of contribution to the character definition of created character 304a based on surface area of the attributes of created character 304a represented by the attribute values. The bucket hat of created character 304a may have the most surface area, followed by the sneakers, followed by the watch and the chain necklace. Therefore, most of the surface area of the attributes are inherited attribute values from designed character 302b (i.e., the bucket hat and the watch) and less inherited from designed character 302a (i.e., the chain necklace and the sneakers). As such, a majority of the 20 stars (e.g., 16 stars) may be determined as the designer benefits for designer B and transferred to designer B. The remaining stars, 4 stars, may be determined as the designer benefits for designer A and transferred to designer A.

Created character 304b may be purchased by a third player on a third client computing platform 104 for $150 (i.e., purchase price). Gaming platform operator(s) 126 may define that 10% of the purchase price, or $15, may be transferred to the respective designers based on the determined quantities of contribution by the individual designers who have contributed to created characters 304b by way of attribute value inheritance. In some implementations, determinations of quantities of contribution (and/or the corresponding designer benefits) may be limited to a certain depth of contributing lineage. For example, contribution determination component 108 may be configured to limit these determinations to three preceding generations (i.e. similar to parents, grandparents, and great-grandparents). In some implementations, this particular depth may be designerspecific (such that contributions of a first designer are limited to a first depth, and contributions of a second designer are limited to a second depth that is different from the first depth).

Contribution quantity component 108 may determine quantities of contribution to a character definition of created character 304b by equalizing the quantity of contribution based on how many of the individual characters created character 304b has inherited from. Thus, because created character 304b inherited attribute values from three characters, designed characters 302a, 302b, and 302c, the quantities of contribution by designed characters 302a, 302b, and 302c (and thus, designer A, B, and C) may be ⅓. Therefore, the designer benefits may be ⅓, or $5, of the purchase price. The $5 may be transferred to each of designer A, B, and C.

Referring to FIG. 1, in some implementations, a stakeholder (one or more of a player, character designer, gaming platform administrator, and/or other user) may determine which attribute values and respective attributes and/or combinations of attribute values, are inheritable at all, or in part, or as a whole.

In some implementations, presentation component 110 may be configured to present newly created characters on user interface 128. Presentation of a created character may be in accordance with a particular visual representation of the created character. The particular visual representation may be defined by the created character definition. Presenting the new character may include assembling individual ones of the inherited attribute values and/or individual ones of the corresponding attributes.

Game component 118 may be configured to execute an instance of an online game within gaming platform 105. Game component 118 may be configured to implement the instance of the online game by receiving and executing commands (e.g., from players, through client computing platforms 104). At least part of the online game may take place in a virtual space that includes a simulated topography. The commands may be received from players through client computing platforms 104 associated with the players. Execution of the commands may facilitate interactions between the players. The execution of the commands may further facilitate locomotion of user-controlled objects within the simulated topography of the virtual space. The user-controlled objects may include one or more (newly generated) characters. In some implementations, individual characters may be user-controlled. Implementing the instance of the online game may include determining view information for presentation of the online game to the players on client computing platforms 104.

Game interface component 120 may be configured to present view information of the online game to players. For example, the presented view information may include the particular visual representation of a newly created character. In some implementations, the presented view information may include the particular visual representation of characters within the simulated topography of the virtual space.

In some implementations, server(s) 102, client computing platform(s) 104, gaming platform(s) 105, external resources 122, and/or other components of system 100 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, gaming platform(s) 105, external resources 122, and/or other components of system 100 may be operatively linked via some other communication media.

A given client computing platform 104 may include one or more processors configured to execute computer program components. The computer program components may be configured to enable an expert or user associated with the given client computing platform 104 to interface with system 100 and/or external resources 122, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users and system 100 and/or between users and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, game controller, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 122 may include sources of information outside of system 100, external entities participating with system 100, and/or other resources. In some implementations, some or all of the functionality attributed herein to external resources 122 may be provided by resources included in system 100. In some implementations, external resources 122 may include external game servers that may provide character definitions.

Server(s) 102 may include electronic storage 124, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102, and/or other components of system 100. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, 118, and/or 120, and/or other components. Processor(s) 130 may be configured to execute components 108, 110, 112, 114, 116, 118, and/or 120, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, and/or 120 are illustrated in FIG. 1 as being implemented within a single processing unit, in implementations in which processor(s) 130 includes multiple processing units, one or more of components 108, 110, 112, 114, 116, 118, and/or 120 may be implemented remotely from the other components. The description of the functionality provided by the different components 108, 110, 112, 114, 116, 118, and/or 120 described below is for illustrative purposes, and is not intended to be limiting, as any of components 108, 110, 112, 114, 116, 118, and/or 120 may provide more or less functionality than is described. For example, one or more of components 108, 110, 112, 114, 116, 118, and/or 120 may be eliminated, and some or all of its functionality may be provided by other ones of components 108, 110, 112, 114, 116, 118, and/or 120. As another example, processor(s) 130 may be configured to execute one or more additional components that may perform some or all of the functionality attributed below to one of components 108, 110, 112, 114, 116, 118, and/or 120.

Figure 2:
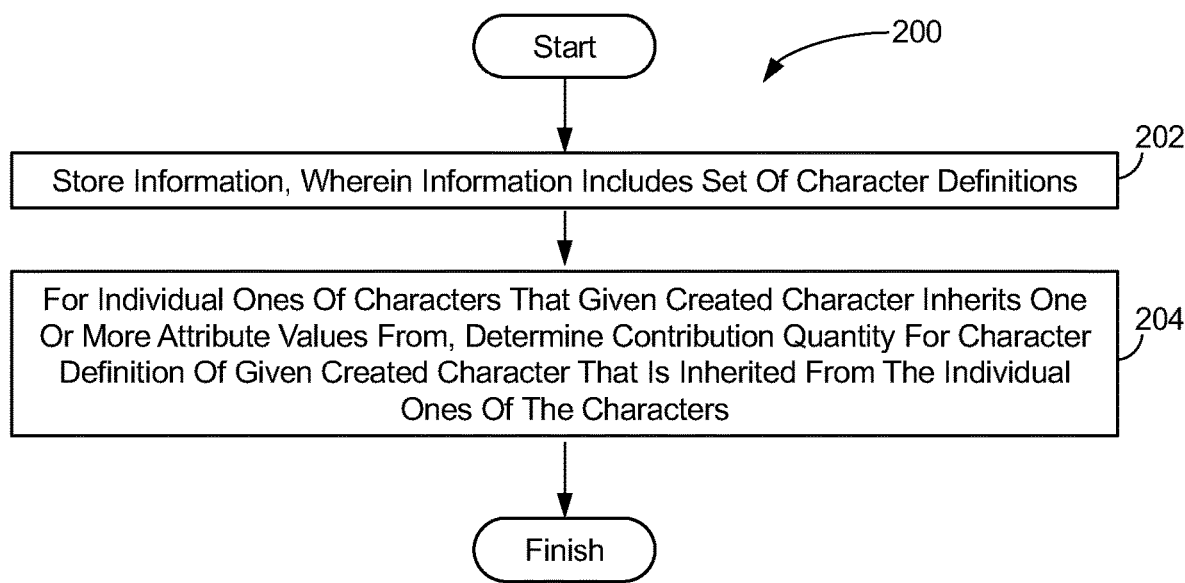
FIG. 2 illustrates a method for determining how much of a created character is inherited from other characters, in accordance with one or more implementations.

FIG. 2 illustrates a method 200 for determining how much of a created character is inherited from other characters, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing, in electronic storage, information. The information may include a set of character definitions. The individual character definitions may define attribute values of individual characters that can operate and interact within the gaming platform. The individual characters may include (i) designed characters with character definitions that include one or more attribute values that are based on at least some user input of designers and (ii) created characters with character definitions defined by at least some inheritance of attribute values from one or more other characters. Operation 202 may be performed electronic storage 124, in accordance with one or more implementations.

An operation 204 may include determining a quantity of contribution for a character definition of the given created character that is inherited from the individual ones of the characters. Such determination may be performed for individual ones of the characters that the given created character inherits the one or more attribute values from. Operation 204 may be performed by one or more hardware processors configured by machine-readable instructions including a component that is the same as or similar to contribution determination component 108, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to determine how much of a created character in a gaming platform is inherited from other characters in the gaming platform, the system comprising:

electronic storage configured to electronically store information, wherein the information includes a set of character definitions, the individual character definitions defining attribute values of individual characters that can operate and interact within the gaming platform, wherein the individual characters include:

(i) a first designed character associated with a first character definition that is based on user input from a first designer, and (ii) a second designed character associated with a second character definition that is based on user input from a second designer, (iii) a first created character associated with a third character definition that includes inherited attribute values from the first designed character and the second designed character; and one or more processors configured by machine-readable instructions to:
for individual ones of the individual characters that a given created character has inherited one or more attribute values from, determine a quantity of contribution that the one or more attribute values contribute to a character definition of the given created character such that one or more attribute values from the first designed character contribute a first quantity of contribution to the third character definition of the first created character and further such that one or more attribute values from the second designed character contribute a second quantity of contribution to the third character definition.

2. The system of claim 1, wherein determining the quantity of contribution is subsequent to one or more purchases of the given created character, wherein determining the first quantity of contribution and the second quantity of contribution occur subsequent to a first purchase of the first created character by a first user.

3. The system of claim 2, wherein the one or more processors are further configured by machine-readable instructions to:
determine designer benefits for individual ones of the designers based on the quantity of contribution and a given purchase price of the given created character such that:
(i) first designer benefits for the first designer are determined based on the first quantity of contribution and a purchase price of the first created character, and
(ii) second designer benefits for the second designer are determined based on the second quantity of contribution and the purchase price of the first created character.

4. The system of claim 3, wherein the one or more processors are further configured by machine-readable instructions to:
transfer the designer benefits to the individual ones of the designers responsive to the one or more purchases of the given created character, such that:
the first designer benefits are transferred to the first designer and the second designer benefits are transferred to the second designer upon the first purchase of the first created character.

5. The system of claim 3, wherein the designer benefits include one or more of a currency, points, and/or credits, wherein the designer benefits are transferred to wallets of the individual ones of the designers responsive to the one or more purchases of the given created character.

6. The system of claim 1, wherein attributes that the attribute values define include visual representation and/or movements, visual representations including color, background color, line detailing, body part proportions, and/or accessories.

7. The system of claim 1, wherein determining the quantity of contribution to the character definition of the given created character is based on one or more prior inheritances of the created characters,
wherein a fourth character definition of a second created character is based on inherited attribute values of the first created character and inherited attribute values of a third designed character, wherein the third designed character is associated with a fifth character definition that is based on user input of a third designer, such that:
the one or more attribute values from the third designed character contribute a third quantity of contribution to the fourth character definition,
the one or more attribute values from the first designed character contribute a fourth quantity of contribution to the fourth character definition via inheritance from the first created character, and
the one or more attribute values from the second designed character contribute a fifth quantity of contribution to the fourth character definition via inheritance from the first created character, wherein the fourth quantity of contribution is determined based on the first quantity of contribution and the third quantity of contribution, wherein the fifth quantity of contribution is determined based on the second quantity of contribution and the third quantity of contribution.

8. The system of claim 1, wherein determining the quantity of contribution to the character definition of the given created character is based on a percentage of the one or more attribute values inherited from the individual ones of the characters.

9. The system of claim 1, wherein determining the quantity of contribution to the character definition of the given created character is based on percentage of surface area of the one or more attribute values inherited from the individual characters.

10. The system of claim 1, wherein determining the quantity of contribution to the character definition of the given created character includes equalizing the quantity of contribution based on an amount of the characters the character definition of the given created character inherited the one or more attribute values from.

11. A method for determining how much of a created character in a gaming platform is inherited from other characters in the gaming platform, the method comprising:
electronically storing, in electronic storage, information, wherein the information includes a set of character definitions, the individual character definitions defining attribute values of individual characters that can operate and interact within the gaming platform, wherein the individual characters include:
(i) a first designed character associated with a first character definition that is based on user input from a first designer, and
(ii) a second designed character associated with a second character definition that is based on user input from a second designer,
(iii) a first created character associated with a third character definition that includes inherited attribute values from the first designed character and the second designed character; and
for individual ones of the individual characters that a given created character has inherited one or more attribute values from, determining a quantity of contribution that the one or more attribute values contribute to a character definition of the given created character such that one or more attribute values from the first designed character contribute a first quantity of contribution to the third character definition of the first created character and further such that one or more attribute values from the second designed character contribute a second quantity of contribution to the third character definition.

12. The method of claim 11, wherein determining the quantity of contribution is subsequent to one or more purchases of the given created character, wherein determining the first quantity of contribution and the second quantity of contribution occur subsequent to a first purchase of the first created character by a first user.

13. The method of claim 12, further comprising:
determining designer benefits for individual ones of the designers based on the quantity of contribution and a given purchase price of the given created character such that:
   (i) first designer benefits for the first designer are determined based on the first quantity of contribution and a purchase price of the first created character, and
   (ii) second designer benefits for the second designer are determined based on the second quantity of contribution and the purchase price of the first created character.

14. The method of claim 13, further comprising:
transferring the designer benefits to the individual ones of the designers responsive to the one or more purchases of the given created character, such that:
   the first designer benefits are transferred to the first designer and the second designer benefits are transferred to the second designer upon the first purchase of the first created character.

15. The method of claim 13, wherein the designer benefits include one or more of a currency, points, and/or credits, wherein the designer benefits are transferred to wallets of the individual ones of the designers responsive to the one or more purchases of the given created character.

16. The method of claim 11, wherein attributes that the attribute values define include visual representation and/or movements, visual representations including color, background color, line detailing, body part proportions, and/or accessories.

17. The method of claim 11, wherein determining the quantity of contribution to the character definition of the given created character is based on one or more prior inheritances of the created characters, wherein a fourth character definition of a second created character is based on inherited attribute values of the first created character and inherited attribute values of a third designed character, wherein the third designed character is associated with a fifth character definition that is based on user input of a third designer, such that:
the one or more attribute values from the third designed character contribute a third quantity of contribution to the fourth character definition,
the one or more attribute values from the first designed character contribute a fourth quantity of contribution to the fourth character definition via inheritance from the first created character, and
the one or more attribute values from the second designed character contribute a fifth quantity of contribution to the fourth character definition via inheritance from the first created character, wherein the fourth quantity of contribution is determined based on the first quantity of contribution and the third quantity of contribution, wherein the fifth quantity of contribution is determined based on the second quantity of contribution and the third quantity of contribution.

18. The method of claim 11, wherein determining the quantity of contribution to the character definition of the given created character is based on a percentage of the one or more attribute values inherited from the individual ones of the characters.

19. The method of claim 11, wherein determining the quantity of contribution to the character definition of the given created character is based on percentage of surface area of the one or more attribute values inherited from the individual characters.

20. The method of claim 11, wherein determining the quantity of contribution to the character definition of the given created character includes equalizing the quantity of contribution based on an amount of the characters the character definition of the given created character inherited the one or more attribute values from.

* * * * *